United States Patent [19]

Ando

[11] Patent Number: 4,907,110
[45] Date of Patent: Mar. 6, 1990

[54] TAPE LOADING DEVICE FOR RECORDING AND/OR REPRODUCING APPARATUS

[75] Inventor: Masahiro Ando, Kanagawa, Japan

[73] Assignee: Canon Kabushiki Kaisha, Tokyo, Japan

[21] Appl. No.: 143,968

[22] Filed: Jan. 14, 1988

[30] Foreign Application Priority Data

Jan. 19, 1987 [JP] Japan ............................... 62-5912[U]
Jan. 19, 1987 [JP] Japan ............................... 62-5913[U]

[51] Int. Cl.$^4$ ............................................. G11B 15/61
[52] U.S. Cl. ......................................... 360/85; 360/95
[58] Field of Search ............................ 360/85, 95, 137

[56] References Cited

U.S. PATENT DOCUMENTS

| | | | |
|---|---|---|---|
| 4,470,086 | 9/1984 | Maeda | 360/85 |
| 4,481,551 | 11/1984 | Maeda | 360/85 |
| 4,561,029 | 12/1985 | Maeda | 360/85 |
| 4,603,361 | 7/1986 | Maeda | 360/85 |
| 4,635,146 | 1/1987 | Koda et al. | 360/85 |
| 4,639,797 | 1/1987 | Kobayashi et al. | 360/71 |
| 4,658,310 | 4/1987 | Kimura | 360/95 |
| 4,704,644 | 11/1987 | Takerouchi | 360/85 |
| 4,706,139 | 11/1987 | Maeda | 360/71 |
| 4,739,421 | 4/1988 | Naragawa | 360/85 |
| 4,745,498 | 5/1988 | Maeda et al. | 360/85 |

Primary Examiner—Stuart N. Hecker
Assistant Examiner—David J. Severin
Attorney, Agent, or Firm—Robin, Blecker, Daley & Driscoll

[57] ABSTRACT

A recording and/or reproducing apparatus comprises a tape loading mechanism arranged to place a tape at heads by pulling the tape out of a tape cassette loaded on the apparatus in a predetermined loading position, an operation mode setting mechanism arranged to shift its position according to each of a plurality of operation modes, and a tape driving mechanism which includes reel shafts. The operation mode setting mechanism is arranged to be capable of selecting a stop mode and a cassette ejecting mode in one and the same specific operation mode setting position thereof according to the state of the tape loading mechanism and to be capable of selecting two different high speed tape feeding modes also in another specific operation mode setting position thereof.

18 Claims, 9 Drawing Sheets

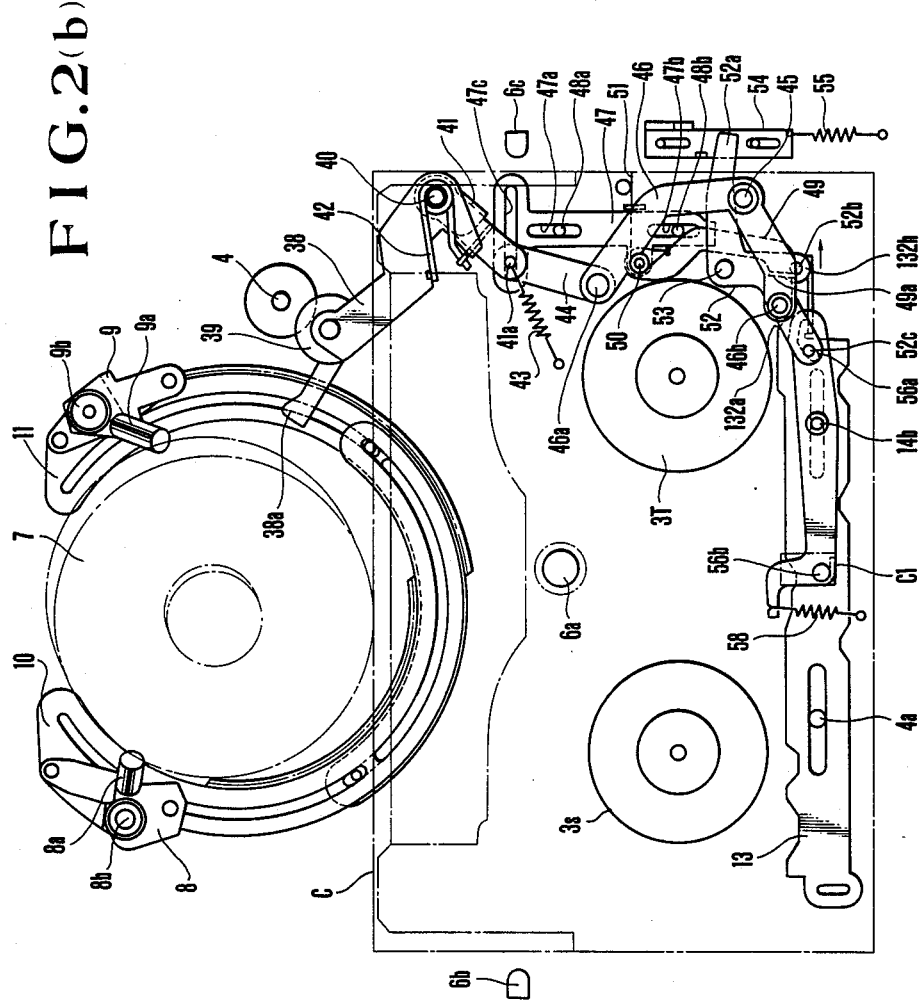

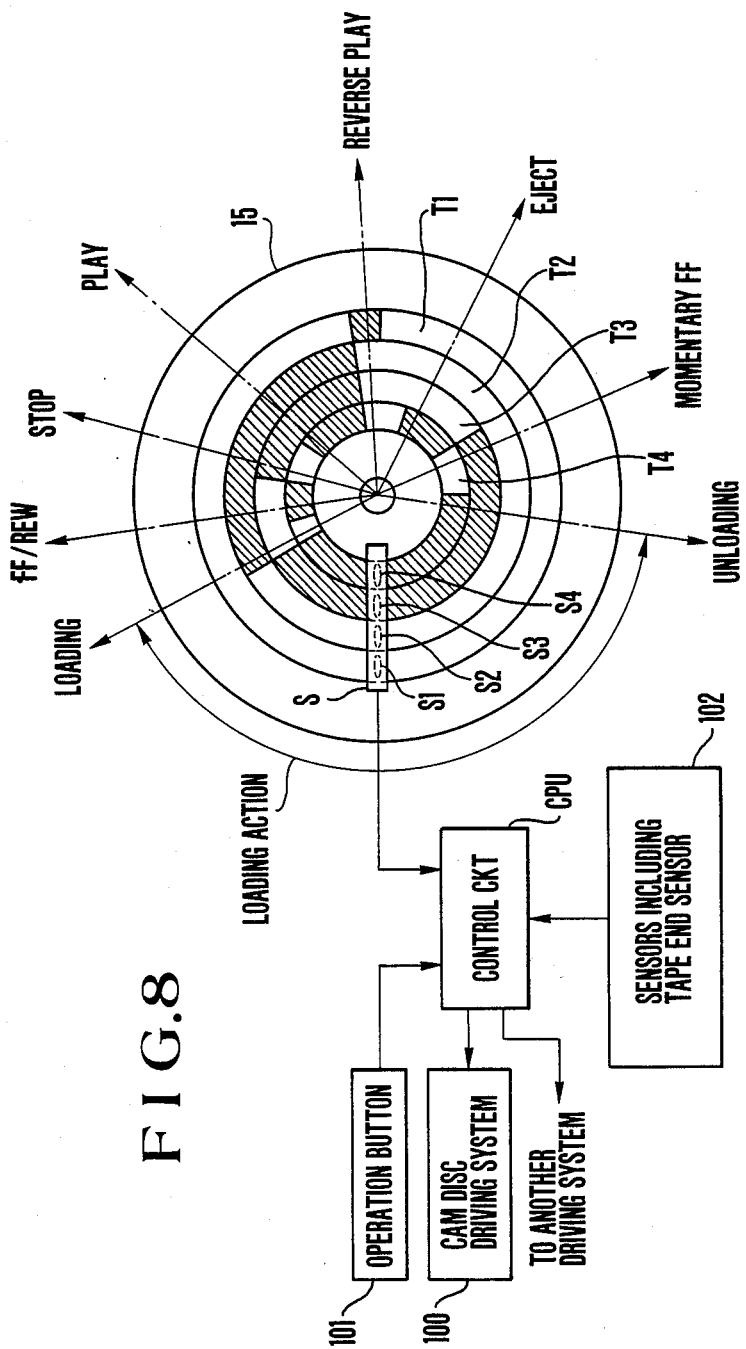

TAPE LOADING DEVICE FOR RECORDING AND/OR REPRODUCING APPARATUS

BACKGROUND OF THE INVENTION:

This invention relates to an operation mode change-over device for a recording and/or reproducing apparatus which has a tape loading device.

DESCRIPTION OF THE RELATED ART:

In an apparatus having a tape loading device which is arranged to load a rotary head drum with a tape by pulling out the tape from a cassette, such as a rotary head type magnetic recording and/or reproducing apparatus, a control arrangement for change-over from one operation mode to another has been complex. More specifically, there are many devices to be controlled, including the above stated loading device, a reel table driving and controlling device, a capstan driving device, a device for pushing a pinch roller against the capstan, a device for ejecting the cassette, etc. These devices must be reliably controlled at accurate timing according to each of different operation modes.

For that purpose, a driving control system consisting of a motor, plunger, etc. is arranged for each of these devices separately from those of others and they are electrically controlled. For example, in the case of control over the contact of a pinch roller with a capstan, control over brake application to a reel table, etc. control is accomplished by performing change-over actions on the discretely arranged plungers, etc. Such arrangement results in an increase in the number of parts. This makes the structural arrangement complex and hinders desired reduction in size, weight and cost. Therefore, such arrangement is hardly applicable to a handy, rotary-head type magnetic recording and/or reproducing apparatus.

Therefore, to simplify the arrangement of the driving control system by mechanically performing change-over actions on the above stated devices according to the operation modes, there is a known method for performing the change-over control by using a mode control lever (hereinafter referred to as a mode lever) which is provided with a plurality of cam faces for causing these devices to operate in mechanical association with each other according to each operation mode. This method permits driving control over these devices without necessitating the above stated arrangement wherein driving systems are discretely provided for the above stated devices and a complex control circuit is used for electrical control over these systems. In the case of an apparatus of the type performing mechanical control by means of the mode lever, however, the position of the mode lever has been arranged to change from one position over to another in control sequence for every operation mode. Therefore, the mode lever must be moved to a great degree. This method thus presents a problem that the size of the apparatus can be hardly reduced in the moving direction of the mode lever.

SUMMARY OF THE INVENTION:

This invention is directed to the solution of the above stated problems of the prior art. Therefore, it is an object of this invention to provide a recording and/or reproducing apparatus wherein the change-over position of a mode lever, which moves to one of various operating positions according to each of a plurality of operation modes, is arranged to shift to one and the same change-over position for selection of specific operation modes in which operations can be performed with the state of a tape driving system, etc., left unchanged among the plurality of operation modes, so that the moving range of the mode lever can be lessened to permit reduction in size of the apparatus in the moving direction of the mode lever.

To attain this object, a recording and/or reproducing apparatus according to this invention is arranged, based on the fact that a stopping action and an ejecting action among other actions can be accomplished without changing the state of a tape driving device which includes a reel shaft, etc. and those of a brake device, etc., to comprise loading means which is arranged to pull a tape out of a cassette mounted on a cassette mount part and to place the tape at magnetic heads, mode change-over means which shifts the position thereof according to a plurality of operation modes, cassette ejecting means for ejecting the cassette from the cassette mount part, and control means which is arranged to enable the cassette ejecting means to operate by moving to a stop position corresponding to a stopped state of the mode change-over means; and thus to permit selection of a stopping state or a cassette ejecting state according to the state of the loading mans when the mode change-over means shifts the position thereof to the stop position. The embodiment is thus arranged to be capable of performing one of two different actions including a stopping action and a cassette ejecting action by shifting the mode lever to the stop position thereof which corresponds to the stopping mode. The moving range of the mode lever thus can be reduced without hindering the operation mode change-over action. Therefore, the embodiment permits reduction in size of the apparatus in the moving direction of the mode lever.

Further, to attain the above stated object, an information recording and/or reproducing apparatus according to this invention is arranged, on the basis of the fact that a high speed tape moving action, such as fast forwarding (hereinafter referred to as FF) and rewinding (hereinafter referred to as REW), etc. and a pre-loading winding action performed to wind, on a reel from which the tape is to be pulled out during a loading action, an amount of the tape necessary for tape loading can be performed with a tape driving system operated in the same manner. This embodiment comprise loading means for placing the tape at heads by pulling it out from a tape cassette and is arranged to be capable of performing, before start of a tape loading action, the pre-loading winding action for winding a given amount of tape on the reel which is on the tape pulling-out side at the time of loading; mode change-over means which has a plurality of operating positions and is arranged to switch the operating states of a plurality of devices including a reel driving device from one state over to another according to its selected position; and control means which is arranged to shift the mode change-over means from one operating position to another prior to the start of the tape loading action after cassette loading according to the high speed tape moving state. The high speed tape moving action such as the FF or REW tape moving action and the preloading tape winding action can be accomplished with the mode lever (the mode change-over means) set in one and the same operating position. Therefore, the moving range of the mode lever can be reduced without hindering the operation mode change-over action. This arrangement of the embodiment permits reduction in size of the apparatus in the moving direction of the mode lever. Further, spacing distances among the devices pertaining to the operation mode change-over can be also reduced, so that the embodiment is advantageous in terms of reduction in size of the apparatus.

It is another advantage of the embodiment that reduction in the range of operating positions of the operation mode change-over means permits simplification of the arrangement of the operation mode change-over means. Therefore, with a plurality of devices interlocked with each other, the changed-over control can be advantageously accomplished over these devices without having recourse to motors, plungers and the like otherwise discretely arranged to perform driving control over these devices.

Other objects and features of the invention will become apparent from the following detailed description of embodiments thereof taken in connection with the accompanying drawings.

BRIEF DESCRIPTION OF THE DRAWINGS:

FIGS. 2(a) and 2(b) are plan views showing the embodiment as in a stopped state respectively.

FIG. 8 is a diagram showing means for detecting the rotating position of the cam disc.

Figure 1:
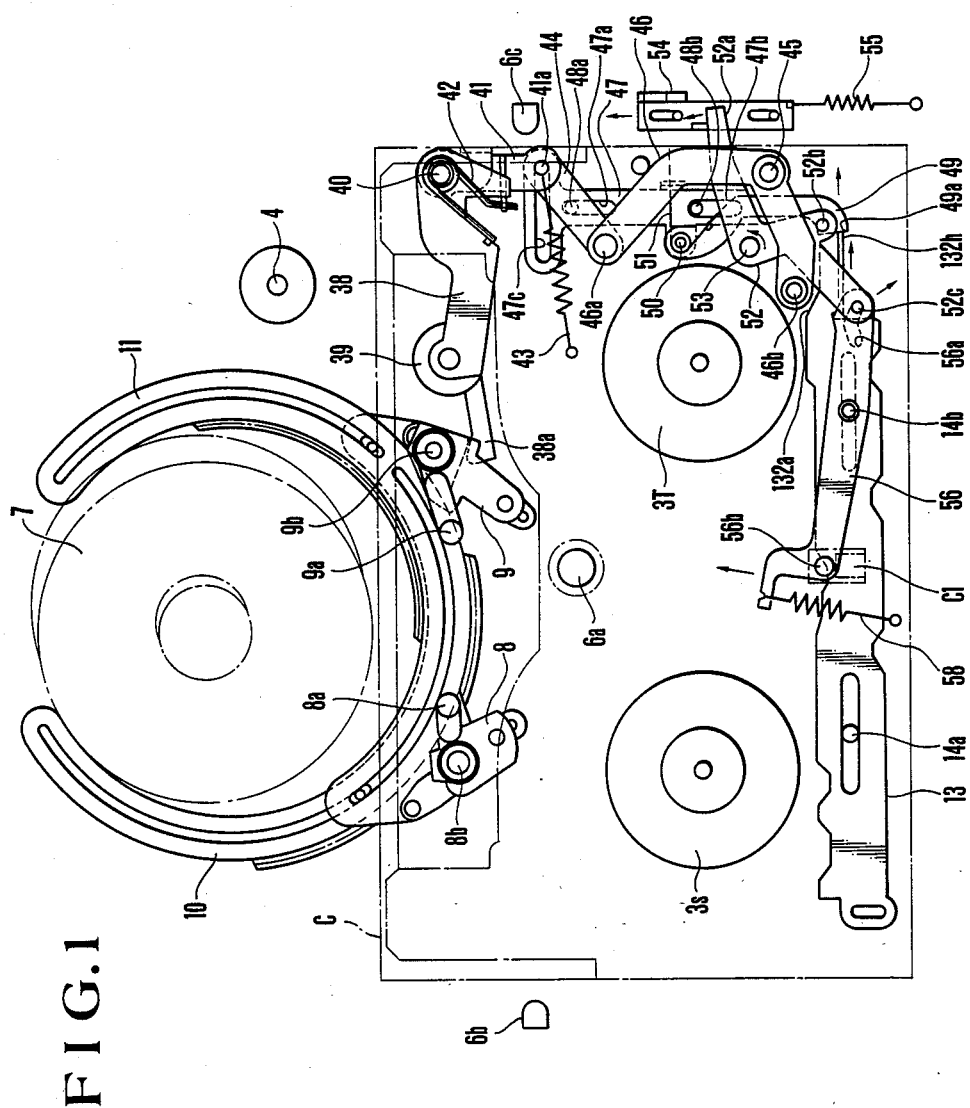
FIG. 1 is a plan view showing an embodiment of this invention as in an ejecting state.

DETAILED DESCRIPTION OF THE PREFERRED EMBODIMENT:

An embodiment of this invention is described as follows with reference to the accompanying drawings:

In the case of this embodiment, the invention is applied to a rotary magnetic head type magnetic recording and/or reproducing apparatus. In each of the drawings, the illustration includes a chassis 1; a cassette mount part 2; supply and take-up reel tables 3S and 3T each of which is provided with a gear part along its outer circumference and has a shaft to be engaged with one of reel hubs of the tape cassette; a capstan 4; a capstan motor 5; and a tape end sensor 6 which consists of a light emitting element 6a and light receiving elements 6b and 6c.

A loading device is arranged as follows: A rotary head drum 7 is mounted on the chassis 1 at a given slanting angle and is arranged to be rotated at a high speed by a motor which is not shown. Moving guide members 8 and 9 are arranged to pull a tape out of a cassette mounted on the cassette mount part 2 and to allow the tape to be wound around the rotary head drum 7. These members 8 and 9 are mounted on a loading levers 10 and 11 which are arranged to slide over the circumference of the rotary drum 7 in association with each other (means for carrying the loading levers is not shown). These levers 10 and 11 are arranged to be moved in combination by means of gears 12a and 12b which constantly engage them. Guide posts 8a, 8b, 9a and 9b are mounted on the moving guide members. A mode lever 13 is arranged to move in response to an operation mode selecting operation to take a position corresponding to an operation mode selected. The mode lever 13 is provided with slots 13a and 13b which are arranged to engage pins 14a and 14b erected on the chassis 1. The lever 13 is thus arranged to be movable to the left or right over the chassis 1.

A cam disc 15 is arranged to move the mode lever 13 according to selection of the operation modes. The cam disc 15 is rotatably mounted on a shaft 16 and is arranged to be rotated by a driving system which is not shown according to the operation mode selected. On one side of the cam disc is formed a cam groove 151 which is provided for operating the mode lever in selecting one of the operation modes. On the other side of the cam disc 15 is formed a switch pattern 152 which is provided for detecting the rotating position of the cam disc as shown in FIG. 8.

A lever 17 is arranged to transmit the rotation of the cam disc 15 to the mode lever 13 and has a pin 17a arranged at one end thereof inserted in the above stated cam groove 151 and has another pin 17b arranged at the other end inserted in a slot 13c formed in the left end part of the mode lever 13. The lever 17 is thus arranged to be turnable on a shaft 18 with these pins in the inserted states. Therefore, when the cam disc 15 rotates according to the operation mode selected, the cam groove 151 turns around the transmission lever 17 round. The lever 17 in turn causes the mode lever 13 to move to the left or to the right from one position over to another according to the operation mode selected.

Figure 7:
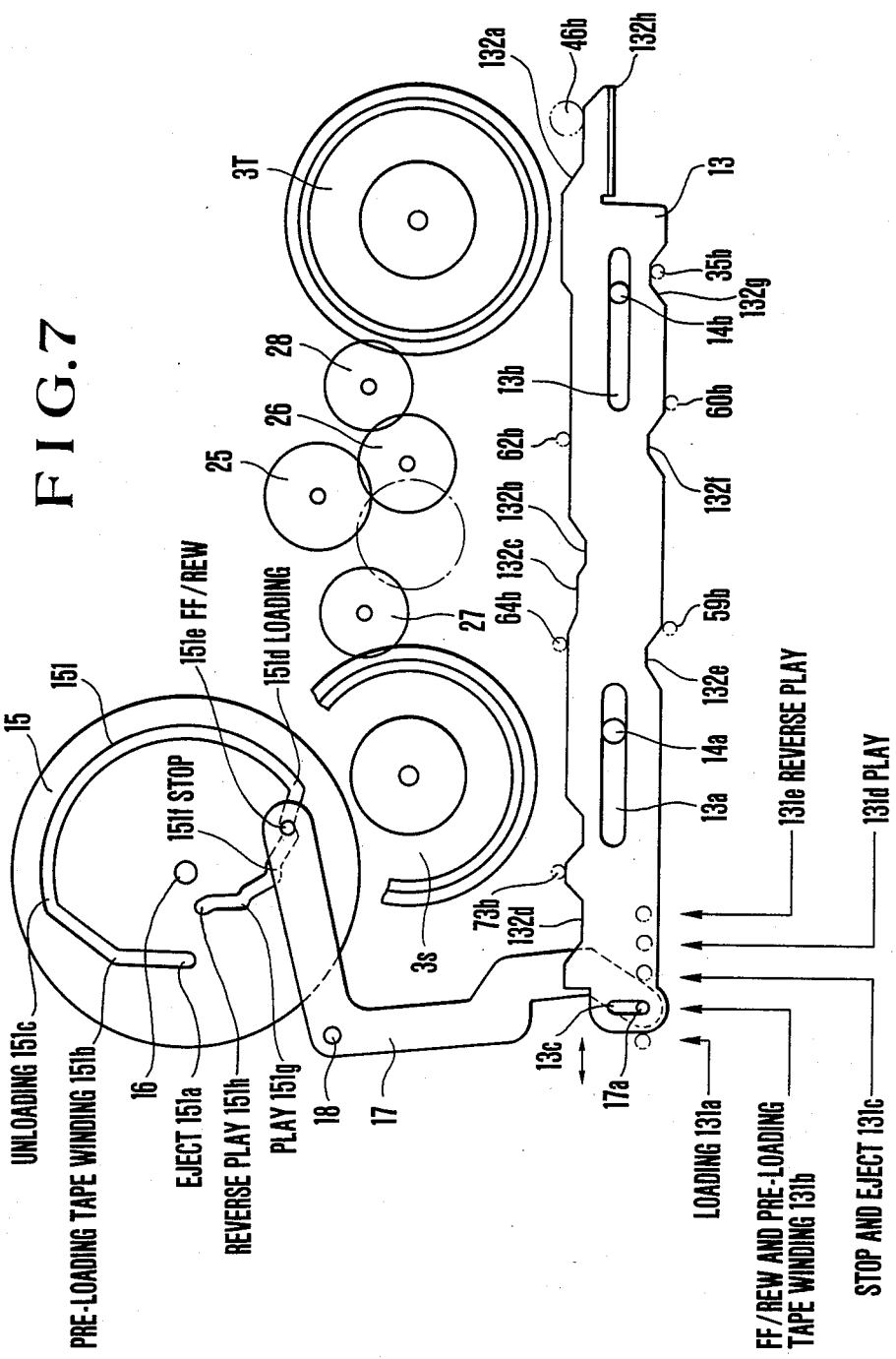
FIG. 7 is a plan view showing a cam disc in relation to a mode lever.

FIG. 7 shows the engaging position of the pin 17a of the transmission lever 17 within the cam groove 151 corresponding to each of the operation modes. Referring to FIG. 7, the illustration includes an eject position 151a; a pre-loading tape winding position 151b; an unloading position 151c; a loading position 151d; an FF/REW moving position 151e; a stop position 151f; a play position 151g; and a reverse play position 151h respectively. Of these operating positions, the eject position 151a and the stop position 151f; the pre-loading winding position 151b and the FF/REW position 151e; and the unloading position 151c and the loading position 151d are located in equal diametric positions respectively. Therefore, while there are a total of eight operation modes, the mode lever 13 is arranged to have only five actual shifting positions.

The shifting positions of the mode lever 13 corresponding to the cam positions include, as shown in FIG. 7, the unloading and loading position, i.e. a loading state position 131a, an FF/REW and pre-loading winding position 131b, a stop and eject position 131c, a play position 131d and a reverse play position 131e which are set with even spacing with the loading position 131a at the furthest left point of the mode lever 13.

The pre-loading tape winding mode is as follows: In this mode, as will be further described later on, the tape is pulled out from the take-up reel in carrying out a tape loading action while the supply reel is locked. If the tape is in a state of having been completely taken up on the supply reel, the loading action cannot be performed. In case that the tape end sensor 6 detects no tape on the take-up reel immediately before the tape loading action, the FF action is performed for a given period of time to cause an amount of tape required for loading to be wound round the take-up reel.

With the cam disc 15 shifted to each operation mode position, the position can be electrically detected, as shown in FIG. 8, jointly by a switch pattern 152 formed on the cam disc 15 and a switch block S which is arranged to be constantly in contact with the pattern 152.

The switch pattern 152 includes a conductive part which is as indicated by a hatched part. Since there are eight operation modes in the case of this embodiment, four switches S1 to S4 are arranged to contact with four concentric tracks T1 to T4. Among them, only the switch that comes into contact with the conductive part turns on. The pattern combination, i.e. combination of the ON and OFF states of these switches, is arranged to vary according to the selection of one of the operation modes, in such a way as to permit detection of each mode.

Information on the mode detected by the ON-OFF combination of the switches S1 to S4, which are arranged in a switch block S, is supplied to a control circuit CPU which is provided for the whole apparatus. The information is decoded. A cam disc driving system 100 is controlled according to the result of decoding. An operation system 101 includes operation buttons, etc. which are not shown. A tape end sensor block 102 includes the tape end sensor 6. The control circuit CPU is arranged to receive control and detection information.

The mode lever 3 has cam parts 132a to 132g which consist of a plurality of protruding and recessed parts and are formed along the upper and lower edges of the lever while an engaging part 132h is formed at the right end of the lever. Although the details of the arrangement will be described later on, the cam part 132a is a cam for pressing a pinch roller; the cam part 132b is a cam for soft brake control and applies a back tension to the take-up reel table 3T during a reverse play operation; the cam part 132c is a lock lever control cam arranged to lock the supply reel table 3S during a loading or unloading operation; the cam part 132d is a band brake control cam arranged to apply a back tension to the supply reel table during a play (playback) operation; the cam parts 132e and 132f are main brake control cams arranged to brake the two reel tables during stop and eject operations; the cam part 132g is a gear change-over cam arranged to effect change-over from one reel table driving system to the other in the case of the FF or REW action; and the cam part 132h is an engaging part arranged to actuate a cassette ejecting device.

Figure 3:
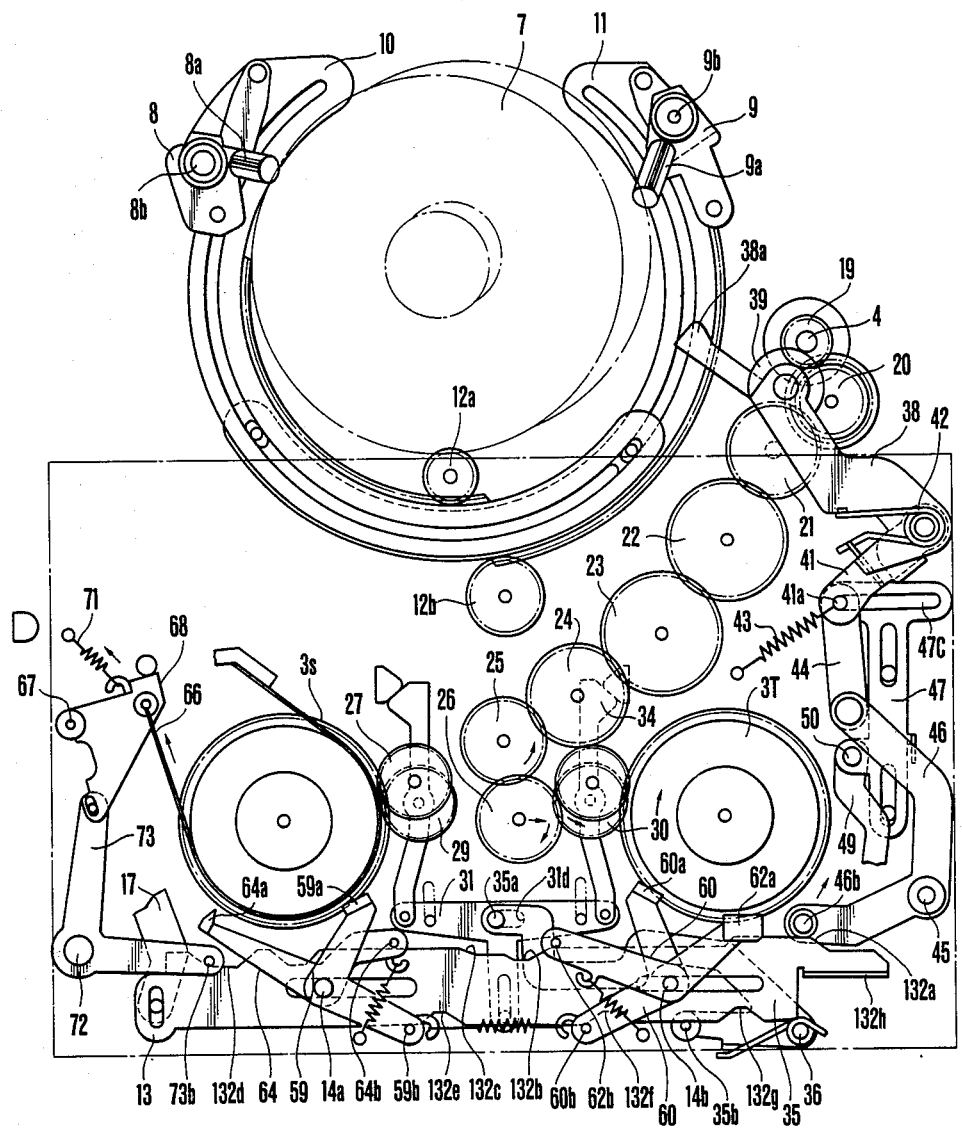
FIG. 3 is a plan view showing the embodiment as in a playing state.
Figure 4:
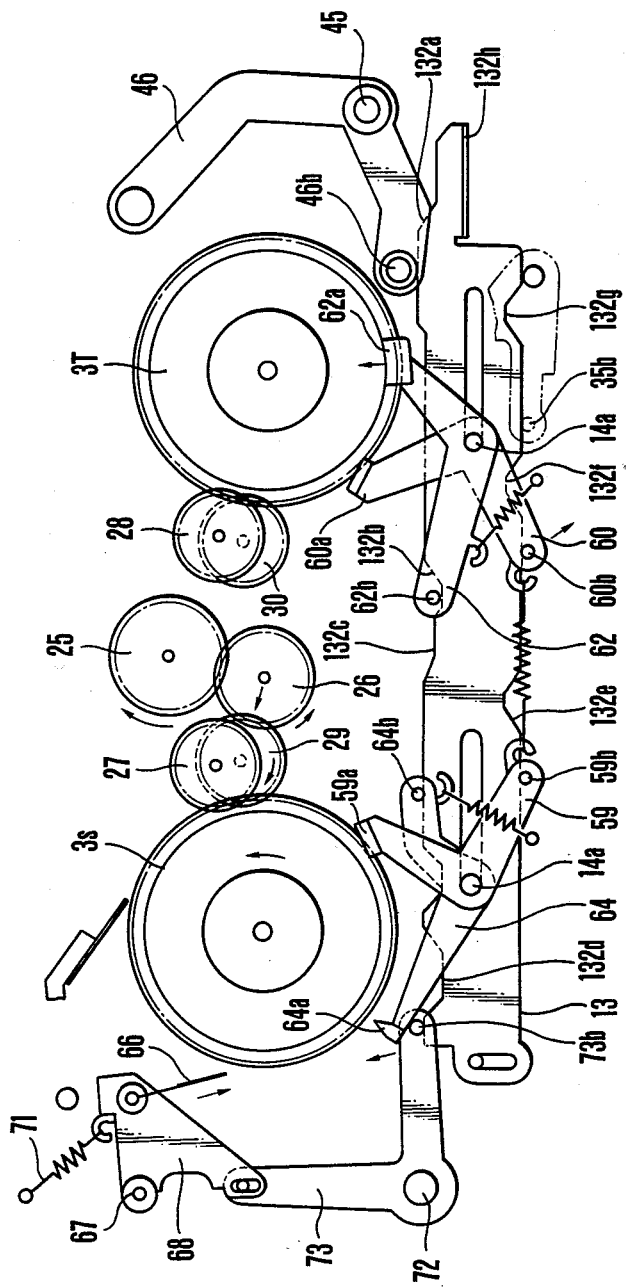
FIG. 4 is a plan view showing it as in a reverse playing state.
Figure 5:
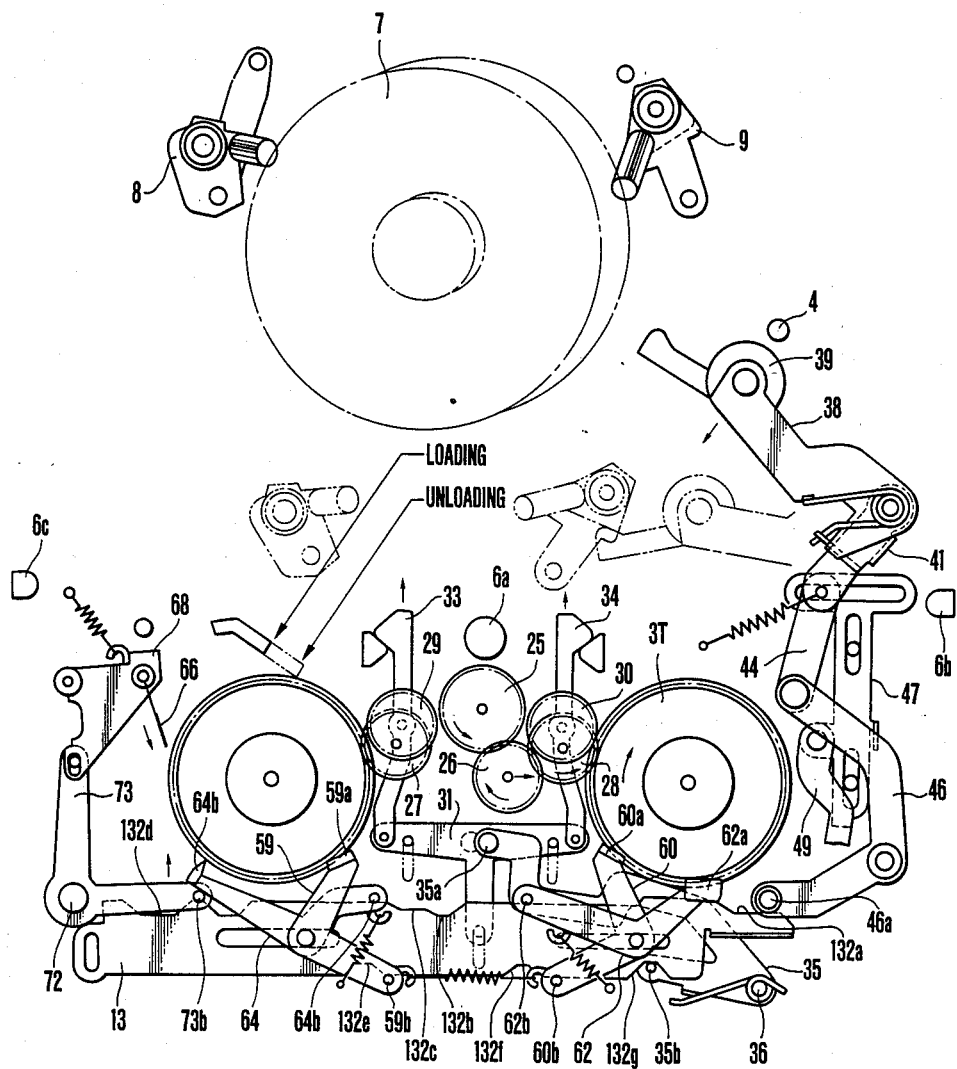
FIG. 5 is a plan view showing it as in a FF/REW tape moving state or in a state of performing a pre-loading tape winding action.

The reel table driving system is arranged as follows: A gear 19 is arranged at the capstan 4 to rotate together with the capstan. The rotation of the capstan is thus transmitted via gears 20, 21, 22, 23 and 24 which are rotatably mounted on the chassis 1 to a gear 25 which is interposed in between the reel tables 3S and 3T. An idler gear 26 is arranged to constantly engage the gear 25 and to swing according to the rotating direction of the gear 25. On both sides of the idler gear are rotatably arranged FF/REW gears 27 and 28 which constantly engage the reel tables 3S and 3T. Play gears 29 and 30 are mounted via levers 33 and 34 on a T-shaped lever 31 which are aranged on the chassis to be vertically movable through slots 32a to 32c and pins 31a to 31c. When the lever 31 is in its lower position, the play gears 29 and 30 serve as rotation transmitting means between the idler gear 26 and the reel tables 3S and 3T and there obtains either a play or reverse play state as shown in FIG. 3 or 4. Then, when the lever 31 is moved into an upper position, the play gears 29 and 30 move upward to allow the FF/REW gears 27 and 28 to serve as rotation transmitting means between the idler gear 26 and the reel tables 3S and 3T. Then, there obtains the FF or REW state as shown in FIG. 5.

Further, the lever 31 is connected by means of a slot 31d and a pin 35a to one end of a lever 35 which is rotatably carried by a shaft 36 on the chassis. The lever 35 is constantly urged to turn around clockwise by a spring 37, i.e. to move the lever 31 upward. An engaging pin 35b is erected at the other end of the lever 35 and is arranged to engage the recessed cam part 132g provided in the lower edge of the mode lever 13. Therefore, when the engaging pin 35b is moved out of the recessed cam part 132g by the movement of the mode lever 13, the lever 35 is allowed to be turned around counterclockwise. This pushes the lever 31 downward to bring about the play or reverse play state. When the engaging pin 35b is within the recessed cam part 132g, the lever 35b is turned around clockwise by the spring 37. This moves the lever 31 upward to bring about the FF or REW state.

A pinch roller control system is arranged in the following manner: A pinch roller lever 38 which is pivotally carried by a shaft 40 has a pinch roller 39 rotatably mounted thereon. The lever 38 is connected by a coiled spring 42 to a lever 41 which is coaxially mounted on the shaft 40. The pinch roller lever 38 is constantly urged to move toward the capstan 4 by a spring 43 which is attached to a pin 41a provided at a free end of a lever 41. During an unloading action, the lever 38 is moved away from the capstan 4 when the fore end engaging part 38a of the lever 38 is pushed down by a moving guide member 9. When the moving guide member 9 is moved upward by the loading action, the pinch roller lever 38 is turned around toward the capstan 4 by the force of the spring 43.

The free end of the lever 41 is connected to a pin 46a provided at one end of the pinch roller pushing lever 46 which is pivotally mounted on a shaft 45 via a pin 41a and a connection rod 44. A pin 46b is erected on the other end of the lever 46 and is arranged to engage the cam part 132a provided on the upper edge of the mode lever 13. The arrangement is such that, although the pinch roller lever 38 is moved toward the capstan 4 by the loading action, the lever 38 comes to a stop in a position which is slightly away from the capstan 4. Then, there obtains the play state as shown in FIG. 3. The lever 46 is turned around clockwise by the slanting cam face 132a of the mode lever 13. The clockwise turn of the lever 46 causes the lever 41 to turn around clockwise via the connection rod 44. This brings the pinch roller 39 into pressed contact with the capstan 4. The stroke of the pinch roller pushing lever 46 is set at such a value that allows the lever 46 to further turn around after the pinch roller 41 comes into contact with the capstan 4, so that the pinch roller can be pushed against the capstan 4 by the elastic force of the coiled spring 42.

Below the pinch roller lever 38 and above the chassis 1, a lever 47 is arranged to be vertically movable through slots 47a and 47b thereof and pins 48a and 48b and is connected to the lever 41 through another slot 47c which is formed in the upper end part thereof.

A control lever 49 is disposed on the lever 41 and arranged to turn around on a shaft 50. A spring 51 is arranged to constantly urge the control lever 50 to turn clockwise. At the free end of the lever 49 is formed an engaging part 49a which is arranged to engage an engaging part 132h formed at the right end of the mode lever 13 and the pin 52b of an eject lever 52. The eject lever 52 is turnable on a shaft 53 and has an engaging part 52a arranged at one end thereof to engage an unlocking lever 54 which is provided for unlocking a cassette box (not shown). The eject lever 52 is further provided with a pin 52c which is disposed at the other end of the lever 52 and is connected to a reel brake cancel lever 56; and an engaging pin 52b which is arranged to engage the engaging part 49a of the control lever 49.

The unlocking lever 54 which is provided for unlocking the cassette box (not shown) is arranged to lock the cassette box in its lower position as viewed on the drawing and to unlock the box in its upper position. A spring 55 is arranged to constantly urge the unlocking lever 54 to move downward. When the eject lever 52 turns around clockwise, the unlocking lever 54 moves upward against the force of the spring 55 to unlock the box.

A reel brake cancel lever 56 is rotatable on a shaft 14b and is connected to the eject lever 52 through a bent-shaped slot 56a which is formed at one end thereof. The lever 56 is provided with a pin 56b which is disposed at the other end of the lever 56 and is arranged to engage a reel brake cancelling piece C1 which is disposed on the reverse side of the cassette C. A spring 58 urges the lever 56 to turn around counterclockwise in the direction of cancelling the reel brake. In ejecting the cassette C with the counterclockwise motion of the eject lever 52, the reel brake cancel lever 56 turns around clockwise against the force of the spring 58 as shown in FIG. 1 in such a way as to apply the brake to the reel within the cassette C during the process of ejection. The slot 56a is formed in bent shape for the following reason: The engaging pin 56b thus can be moved away from the reel brake cancelling piece C1 the instant the eject lever 52 begins to turn around. This quickens the timing of brake application to the reel and also prevents the pushing force of the engaging pin 56b from imposing any load on the cassette box (not shown) during the process of ejection.

Various braking devices for applying the brake to the reel tables 3S and 3T are arranged as follows:

Referring to all the applicable drawings, main brake levers 59 and 60 are arranged to be turnably carried by shafts 14a and 14b. In the stop (or pause) mode, these main brake levers apply the brake to the reel tables. Each of the main brake levers 59 and 60 is provided with a brake pad 59a or 60a which is arranged at one end of the lever to come into pressing contact with the circumference of the reel table. The other end parts of these levers 59 and 60 are interconnected by a spring 61. The spring 61 is arranged to urge these levers to turn around counterclockwise and clockwise in the directions of having the brake pads normally pushed against the reel tables.

The brake levers 59 and 60 are further provided with engaging pins 59b and 60b which are arranged on the other ends of these levers to come into the recessed cam parts 132e and 132f provided in the lower edge of the mode lever 13. The brake levers 59 and 60 are thus arranged to be turned around by the spring 61 into a brake applying state when these engaging pins 59b and 60b are brought into the corresponding recessed cam parts 132e and 132f by the movement of the mode lever 13.

A soft brake lever 62 is turnably carried by a shaft 14b. In the case of a reverse play operation, the lever 62 applies soft brake or a back tension to the take-up reel table 3T. The lever 62 has a pad 62a which is provided at one end opposed to the take-up reel table 3S and an engaging pin 62b which is arranged on the other end part to engage the recessed cam part 132b formed in the upper edge of the mode lever 13. The soft brake lever 62 is urged by a spring 63 to bring the pad 62a into pressed contact with the reel table 3T. When the mode lever 13 moves to allow the engaging pin 62b to come into the recessed cam part 132b, spring 63 causes the lever 62 to turn around toward the take-up reel table 3T.

A reel lock lever 64 is turnable on a shaft 14a and is arranged to lock the supply reel table 3S during a loading or unloading action. The reel lock lever 64 has a lock claw 64a arranged at one end thereof to engage the gear part of of the supply reel table 3S and an engaging pin 64b which is arranged at the other end to engage the recessed cam part 132c of the upper edge of the mode lever 13. A spring 65 urges the reel lock lever 64 to bring the lock claw into engagement with the reel table 3S. When the mode lever 13 moves to allow the engaging pin 64b to come into the recessed cam part 132c, the spring 65 causes the lock lever 64 to turn around toward the reel table 3S. A band brake 66 is wound around the circumference of the supply reel table 3S and is arranged to apply a back tension to the supply reel table 3S during the play operation. The band brake 66 has one end thereof attached to a turning piece 68 which is arranged to be turnable on a shaft 67 and the other end to a tension regulator which is not shown but is arranged to be turnable. The turning piece 68 is urged by a spring 71 to turn around counterclockwise to stretch the band brake 66 to tighten it on the reel table 3S and is connected through a slot 68a to a pin 73a provided on one end of a lever 73 which is arranged to be turnable on a shaft 72. The lever 73 has an engaging pin 73b arranged on the other end thereof to come into the recessed cam part 132 of the upper edge of the mode lever 13. The band brake 66 is thus arranged to be controlled by turning around the turning piece 68 according as the mode lever 13 moves. In other words, when the engaging pin 73b come to a position where it can be engaged with the recessed cam part 132d by the movement of the mode lever 13, the spring 71 causes the turning piece 68 and the lever 73 to turn around counterclockwise and clockwise respectively. After that, the band brake 66 is in a position to control the backward tension of the supply reel table 3S according as the tension regulator operates. Further, the band brake 66 is arranged to slacken to cancel the brake irrespectively of the position of the turning piece 68 under an unloading condition. This action is well known and requires no detailed description.

Figure 2A:
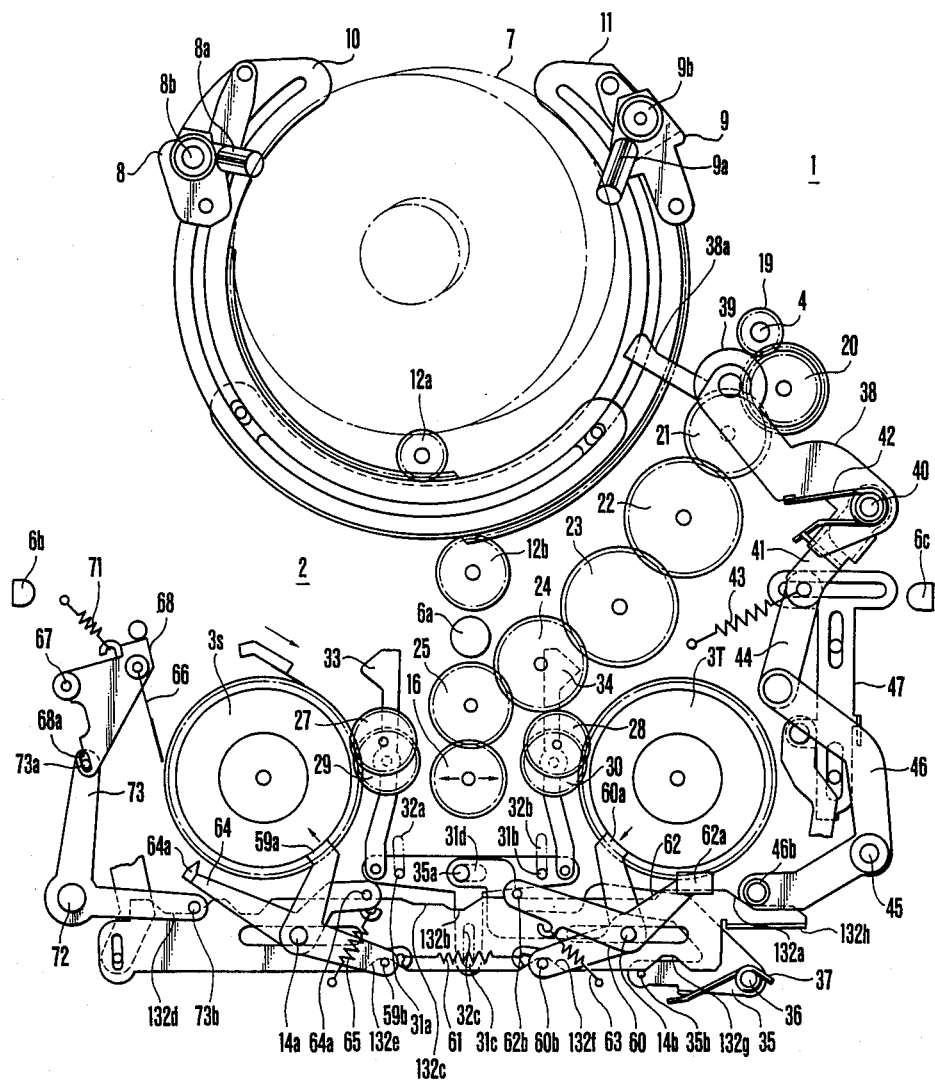

In the magnetic recording and/or reproducing apparatus arranged according to this invention as described in the foregoing, each of varied operation modes is arranged to be set with the mode lever 13 moved via a lever 17 by the rotation of a cam disc 15. The mode is determined by each point within the cam groove 151 of the cam disc 15 where the pin 17b of the lever 17 engages the cam groove 151. Each of the rotating positions of the cam disc 15 is detected jointly by the switch pattern 152 and the switch member S which are arranged as shown in FIG. 8. Then, the control circuit CPU performs a necessary control action for the operation mode according to the result of detection. In the case of the loading or unloading action, the cam disc 15 is rotated; and the action is carried out while the engaging pin 17b of the lever 17 is moving between an unloading position 151c and a loading position 151d within the cam groove 151. Before commencement of the loading action, i.e. under an unloaded condition, the FF and eject action is momentarily performed. The FF/REW, stop, play, reverse play actions, etc. are performed after completion of the tape loading action. The tape loading operation is as follows:

FIGS. 2(a) and 2(b) show the embodiment as in the stopped state. In this instance, the moving guide members 8 and 9 are in a loading state having the tape wound around the rotary head drum 7. The mode lever 13 has been shifted to the stop/eject position 131c. By the upward move of the moving guide member 9, the pinch roller lever 38 has been moved close to the capstan 4 by the elastic force of the spring 43. Meanwhile, however, the pinch roller pushing lever 46 is in a position of having been turned around counterclockwise with the engaging pin 46b out of the slanting cam face 132a. The pinch roller 39 is thus not in contact with the capstan 4 and is kept a little away from the latter.

Meanwhile, with the pinch roller lever 38 having moved upward as shown in FIG. 2(b), the control lever 49 is moved upward via the lever 47. The engaging part 49a of the lever 49 is moved upward away from a position between the right end engaging part 132h of the mode lever 13 and the engaging pin 52b of the eject lever 52. When the mode lever 13 moves in either direction, therefore, this movement is not transmitted to the eject lever 52 and no cassette ejecting action takes place.

The lever 35 is turned around counterclockwise against the force of the spring 37 with the engaging pin 35b moving away from the recessed cam part 132g of the mode lever 13. This pushes the lever 31 to its lower position to cause the play gears 29 and 30 to serve as rotation transmitting means between the idler gear 26 and the real tables 3S and 3T. The reel driving system is thus in the play or reverse play condition as shown in FIGS. 3, 4, etc. The main brake levers 59 and 60 are in a state of having applied the brake to the reel tables 3S and 4T being turned around counterclockwise and clockwise by the elastic force of the spring 61 with their engaging pins 59b and 60b engaging the recessed cam parts 132e and 132f respectively. The soft brake lever 62 and the reel lock lever 64 are in a brake cancelling state of having been turned around clockwise and counterclockwise with their engaging pins 62b and 64b moving away from the recessed cam parts 132b and 132c respectively.

FIG. 3 shows the embodiment as in a play state. The moving guide members 8 and 9 are in a loading state having the tape wound around the rotary head drum 7. Under this condition, the embodiment can be brought into the play state by rotating the cam disc 15 to shift the mode lever 13 to the play position 131d. The pinch roller pushing lever 46 has its engaging pin 46b pushed upward by the slanting cam face 132a and thus turns around clockwise. The clockwise turn of the lever causes the lever 41 to turn clockwise via the connection rod 44. This pushes the pinch roller 39 against the capstan 4 to bring the tape into a travelling state.

The reel table driving system is in the following state: The engaging pin 35b of the lever 35 is in a state of having moved out of the recessed cam part 132g. The lever 31 has been moved to the lower position thereof where it causes the play gears 29 and 30 and serves as rotation transmitting means between the idler gear 26 and the reel tables 3S and 4T. The main brake levers 59 and 60 respectively have their engaging pins 59b and 60b moved out of the recessed cam parts 132e and 132f of the mode lever 13 and are thus in a state of having been turned around clockwise and counterclockwise against the force of the spring 61 to cancel the brake applied to the reel tables 3S and 4T. The soft brake lever 62 and the reel lock lever 64 respectively have their engaging pins 62b and 64b disengaged from the recessed cam parts 132b and 132c and are in their released state like in the case of the stop state shown in FIG. 1.

Meanwhile, the lever 73 has its engaging pin 73b come into the recessed cam part 132d to be turned around clockwise thereby. The turning piece 68 is caused to turn around counterclockwise by the spring 71. This renders the band brake 66 operative to apply a given degree of back tension to the supply reel table 3S according to the tension regulator which is not shown.

In the play state described above, if the mode lever 13 is moved further rightward into the reverse play position 131e by the rotation of the cam disc 15, there obtains a reverse play state, which is as shown in FIG. 4. In that instance, the operating positions of the lever 35, the pinch roller pushing lever 46, the main brake levers 59 and 60 and the reel lock lever 64 which are provided for operating the reel driving system are the same as in the case of the play state shown in FIG. 3.

The soft brake lever 62 has its engaging pin 62b moved out of the recessed cam part 132b and moved counterclockwise by the spring 63 to bring its pad into pressed contact with the take-up reel table 3T. The lever 62 is thus in a state of applying a backward tension. The lever 73 has its engaging pin 73b moved out of the recessed cam part 132d and moved counterclockwise. The turning piece 68 is thus forcedly turned around clockwise to cancel the force of the band brake 66.

FIG. 5 shows the embodiment as in the FF/REW state. The cam disc 15 is rotated under a loading condition to move the mode lever 13 to the FF/REW, preloading winding position 131b thereof. This brings the embodiment into the FF/REW state. In the case of this embodiment, the apparatus is arranged to perform the FF or REW action with the tape left in a state of being wound around the rotary head drum 7. The embodiment is in a brake cancelled condition with the engaging pins 59b, 60b, 62b and 64b of the main brake levers 59 and 60, the soft brake lever 62 and the reel lock lever 64 all moved out of the recessed cam parts 132e, 132f, 132b and 132c of the mode lever 13 and also with the engaging pin 73b of the lever 73 disengaged from the recessed cam part 132d.

Meanwhile, the pinch roller pushing lever 46 turns around counterclockwise with its engaging pin 46b disengaged from the slanting cam face 132a. This releases the pinch roller 39 from the state of being pushed against the capstan 4. This position of the lever 46 is the same as in the stop state shown in FIGS. 2(a) and 2(b).

With respect to the reel table driving system, the lever 35 is allowed to be turned around clockwise by the elastic force of the spring 37 with its engaging pin 35b coming into the recessed cam part 132g. The clockwise turn of the lever 35 pushes the lever 31 into its upper position. This causes the play gears 29 and 30 to move upward away from their positions between the idler gear 26 and the reel tables. The rotation transmitting means between the idler gear 26 and the reel tables 3S and 3T are replaced with the FF/REW gears 27 and 28 to permit an FF or REW action.

While the operations to be performed under the loading condition are as described above, the operation modes before the loading condition are as described below:

FIG. 1 shows the embodiment as in a state of ejecting the cassette, i.e. an ejecting state. The position of the mode lever 13 in the ejecting state is identical with the stop position shown in FIGS. 2(a) and 2(b). Therefore, the driving systems and brake devices are all in the same states as in the case of the stop state.

In the case of this embodiment, the two different actions including a stopping action and an ejecting action are arranged to be possible with the mode lever 13 in one and the same operating position on the basis of the fact that a loading action is performed in the stop state and the ejecting action in the unloading state. In other words, the moving guide members 8 and 9 are caused by the unloading action to move away from the rotary head drum 7 toward the inner part of the tape (not shown) within the cassette C. In this instance, the pinch roller lever 38 is pushed down by the moving guide member 9 and is thus turned around counterclockwise against the force of the spring 43 away from the capstan. This causes the lever 47 to slide downward. The engaging part 49a of the control lever 49 is then moved downward between the right end engaging part 132h of the mode lever 13 and the engaging pin 52b of the eject lever 52. The downward movement of the control lever 49 enables the two to engage each other to transmit the lateral movement of the mode lever 13 to the eject lever 52.

When the engaging pin 17b of the lever 17 shifts the engaging position thereof within the cam groove 151 of the cam disc 15 to the eject position 151a, i.e., when the mode lever 13 moves from its left position to the stop-/eject position 131c, the engaging part 132h of the mode lever 13 pushes the engaging pin 52b of the eject lever 52 via the engaging part 49a of the control lever 49. This causes the eject lever 52 to turn around counterclockwise. The counterclockwise turn of the eject lever 52 causes the unlocking lever 54 to move upward against the force of the spring 55. The cassette box which is not shown is unlocked and the cassette is ejected.

The different actions including the stop action and the eject action thus can be performed with the mode lever 13 in the same operating position by detecting the state of the loading device On the right-hand side of the stop/eject position 131c of the mode lever 13, there are further provided the play position 131d and the reverse play position 131e. However, as apparent from the shape of the cam groove 151 of the cam disc 15, the unloading position 151c, or the loading position 131a as viewed on the part of the mode lever 13, is never bypassed. Therefore, when the engaging part 49a of the control lever 49 descends, the mode lever 13 is always in its left position. In the case of the eject action, the mode lever 13 thus moves from the left position to the stop/eject position 131c. In other words, the control lever 49 never collides with the upper edge of the mode lever 13 when it comes down. Concurrently with the turning motion of the eject lever 52, the reel brake cancel lever 56 is turned around clockwise to move away from the reel release piece C1 of the cassette C.

Then, the brake is immediately applied to the reel of the cassette C, so that the tape can be prevented from slackening within the cassette.

The pre-loading tape winding is performed as follows: As apparent from the shape of the cam groove 151 of the cam disc 15 as shown in FIG. 7, the pre-loading tape winding position 151b is located immediately before the commencement of a loading action after the eject position 151a. The operation in this mode is as described in the foregoing and, therefore, the details of it is omitted from description here. Before commencement of the loading action after the cassette C is mounted, the engaging pin 17b of the lever 17 comes to the pre-loading of the tape winding position 151b within the cam groove 151 and the mode lever 13 comes to the FF/REW and pre-loading tape winding position 131b which corresponds to the position 151b of the cam groove 151. This is detected by the switch pattern 152 and the switch block S which are disposed at the cam disc 15. With this state detected, if the tape end sensor 6 detects a leader portion of the tape at the take-up reel table 3T (indicating a condition that no tape has been taken up on the take-up reel table 3T and the tape cannot be pulled out), the control circuit CPU of FIG. 8 produces an instruction to bring the embodiment momentarily into the FF moving mode and an amount of tape to be pulled out for the loading action is taken up on the takeup reel table 3T. This arrangement effectively insures that the tape pulling-out action is impossible with no tape on the side of the tape-up reel table 3T at the beginning of the loading action.

The position of the mode lever 13 is exactly the same as under the FF/REW condition shown in FIG. 5. Both the reel driving system and the brake system are also in the same operating states.

Figure 6:
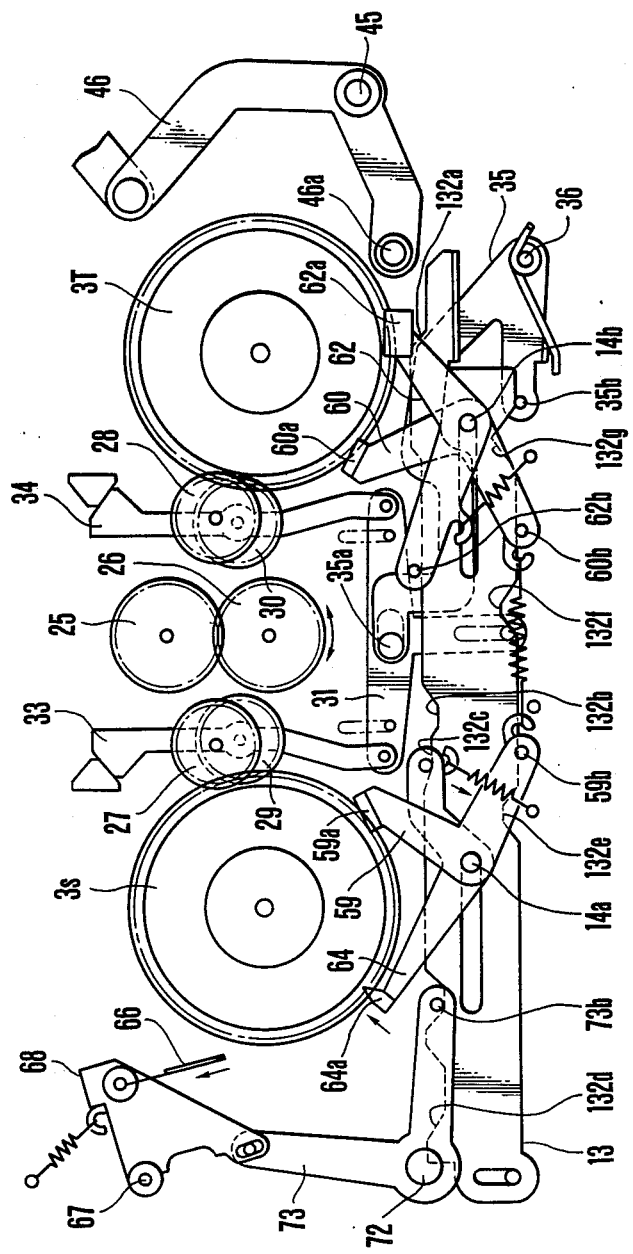
FIG. 6 is a plan view showing it as in a state of performing a tape loading or unloading action.

FIG. 6 shows the embodiment as in the loading or unloading process. The engaging pin 17b of the lever 17 is located at a point between the unloading position 151c and the loading position 151d within the cam groove 151 of the cam disc 15. The mode lever 13 is in the leftmost position 131a for loading. In this case, the pinch roller pushing lever 46, the main brake levers 59 and 60 and the soft brake lever 62 are all in released states. In the reel driving system, the lever 35 is turned around counterclockwise with the engaging pin 35b thereof moved out of the recessed cam part 132g. As a result, the lever 31 is in a state of having been moved to its lower position. The play gears 29 and 30 are thus brought into a position to serve as rotation transmitting means between the idler gear 26 and the reel tables 3S and 3T.

The reel lock lever 64 is turned around clockwise with the engaging pin 64b thereof coming into the recessed cam part 132c. The engaging claw 64a of the lever 64 then engages the gear of the supply reel table 3S to lock the reel table 3S. During the process of the loading action, therefore, the tape is pulled out only from the tape-up reel table 3T. This arrangement prevents the position of the tape from being disturbed during tape loading.

In accordance with the arrangement of the recording and/or reproducing apparatus embodying this invention, different operation modes can be set with the mode lever which is provided for setting operation modes set in one and the same position. In other words, the stop or ejecting state is obtainable with the mode lever set in one position while the FF/REW or pre-loading tape winding state is obtainable with the mode lever set in another position. This arrangement permits reduction in the moving range of the operation mode change-over means and thus permits reduction in size of the apparatus in the moving direction of the change-over means. Further, the arrangement also permits reduction in spacing distances between devices pertaining to the operation mode change-over. The embodiment has a great advantage in terms of reduction in size of the apparatus. It is another advantage of the embodiment that the operation mode change-over means can be simplified by virtue of the reduced number of the operating positions thereof.

By virtue of this, change-over control can be mechanically accomplished over a plurality of devices in an interlocked manner without having recourse to motors and plungers or the like otherwise requisitely discretely arranged for driving control over these devices.

In the case of the embodiment described, this invention is applied to a recording and/or reproducing apparatus of the kind having a rotary head drum. However, the invention is not limited to the apparatus of that kind but is of course also applicable to any apparatus that is arranged to perform a tape loading action by pulling the tape out of a cassette.

What is claimed is:

1. A recording and/or reproducing apparatus, comprising:
    (a) tape loading means for loading a tape at a loading position in which said tape is wound around a rotary head drum by pulling said tape out of a cassette mounted on said apparatus;
    (b) first mode setting means arranged to move and change its position according to an operation mode selected among a plurality of operation modes of said apparatus; and
    (c) second mode setting means arranged to detect a state of said loading means and to be capable of setting different operation modes among said plurality of modes at the same position of said first mode setting means according to the detected state of said loading means.

2. An apparatus according to claim 1, wherein said second mode setting means is arranged to selectively set one of a plurality of operation modes according to whether said tape loading means is in a loaded state with said tape pulled out of said cassette and wound around said head drum or in an unloaded state with said tape remaining in a pulled-in state within said cassette.

3. An apparatus according to claim 1 or 2, further including a tape driving mechanism having plural states and wherein said first mode setting means includes a cam which is arranged to change the rotating position thereof for each of said operation modes; and a mode setting lever which is arranged to move according to the rotation of said cam and to change the state of said tape driving mechanism from one state over to another.

4. An apparatus according to claim 3, wherein said tape driving mechanism includes:
    (a) a capstan arranged to move said tape;
    (b) a pinch roller arranged to push said tape against said capstan with said tape interposed in between said capstan and said pinch roller;
    (c) two reel shafts which engage tape reel hubs disposed within said cassette, and a reel shaft driving device which is arranged to drive said reel shafts;
    (d) a brake device which is arranged to brake said reel shafts; and
    (e) a tension control device for controlling the back tension of said tape while said tape is travelling.

5. An apparatus according to claim 4, wherein said mode setting lever of said first mode setting means is arranged to slide along a cam groove formed in said cam and is provided with a plurality of cam parts for controlling devices included in said tape driving mechanism.

6. A recording and/or reproducing apparatus comprising:
    (a) cassette loading means arranged to load a cassette on said apparatus in a given loading position or to eject said cassette from said loading position;
    (b) tape loading means for loading a tape at a loading position in which said tape is wound around a rotary head drum by pulling said tape out of a cassette mounted on said apparatus;
    (c) mode setting means having a stop position and arranged to move and change its position according to an operation mode selected among a plurality of operation modes; and
    (d) control means arranged to control the ejecting action of said cassette loading means at the stop mode position of said mode setting means in accordance with the position of said tape loading means.

7. An apparatus according to claim 6, wherein said control means is arranged to selectively set one of a plurality of operation modes according to a tape loading state with said tape pulled out of said cassette and wound around said head drum by said tape loading means or according to a tape unloading state with said tape remaining in a pulled-in state within said cassette.

8. An apparatus according to claim 6 or 7, further including a tape driving mechanism having plural states and wherein said mode setting means includes a cam which is arranged to change the rotating position thereof for every one of said operation modes; and a mode setting lever having a stop position and which is arranged to move according to the rotation of said cam to change the state of said tape driving mechanism from one state over to another.

9. An apparatus according to claim 8, wherein there is provided lock means which is arranged to lock said cassette loading means in said loading position; and said control means is arranged to connect said lock means to said mode setting lever to move said lock means to an unlocking position thereof if said tape unloading state exists when said operation mode setting lever moves to said stop mode position and to disconnect said lock means from said mode setting lever if said tape loading state exists.

10. An apparatus according to claim 8, wherein said tape driving mechanism includes:
    (a) a capstan arranged to move said tape;
    (b) a pinch roller arranged to push said tape against said capstan with said tape interposed in between said capstan and said pinch roller;
    (c) two reel shafts which engages tape reel hubs disposed within said cassette, and a reel shaft driving device which is arranged to drive said reel shafts;
    (d) a brake device which is arranged to brake said reel shafts; and
    (e) a tension control device for controlling the back tension of said tape while said tape is travelling.

11. An apparatus according to claim 10, wherein said operation mode setting lever of said mode setting means is arranged to slide along a cam groove formed in said cam and is provided with a plurality of cam parts for controlling devices included in said tape driving mechanism.

12. A recording and/or reproducing apparatus of the type including heads, comprising:
  (a) tape loading means for placing a tape at said heads by pulling out said tape from a cassette loaded on said apparatus in a predetermined cassette loading position;
  (b) reel shaft driving means arranged to wind or rewind said tape by engaging and driving tape reel hubs which are disposed within said cassette, said reel shaft driving means including reel shafts; and
  (c) operation mode setting means arranged to change the position thereof according to each of a plurality of operation modes and to be capable of setting in one and the same position thereof a first tape fast feeding mode in which said reel shaft driving means is driven at a high speed prior to the tape loading action of said tape loading means and a second tape fast feeding mode in which said reel shaft driving means is driven in one of a fast forward or a rewind direction in said tape loading state.

13. An apparatus according to claim 12, wherein said tape loading means is arranged to place said tape at said heads by pulling out said tape from one of said tape reel hubs during said tape loading action.

14. An apparatus according to claim 13, further comprising:
  (a) detecting means for detecting an amount of tape on said one of tape reel hubs which is disposed within said cassette; and
  (b) reel shaft controlling means arranged to cause a given amount of tape to be taken up on said one of reel hubs only when said detecting means detects no amount of tape on said one of reel hubs.

15. An apparatus according to claim 14, wherein said reel hub from which said tape is pulled out is the hub of a take-up reel.

16. An apparatus according to claim 14, wherein said operation mode setting means includes a cam which is arranged to change the rotating position thereof for every one of operation modes; and an operation mode setting lever which is arranged to move according to the rotation of said cam and to change the state of a tape driving mechanism from one state over to another.

17. An apparatus according to claim 16, wherein said tape driving mechanism includes:
  (a) a capstan arranged to move said tape;
  (b) a pinch roller arranged to push said tape against said capstan with said tape interposed in between said capstan and said pinch roller;
  (c) two reel shafts which engages tape reel hubs disposed within said cassette, and a reel shaft driving device which is arranged to drive said reel shafts;
  (d) a brake device which is arranged to brake said reel shafts; and
  (e) a tension control device for controlling the back tension of said tape while said tape is travelling.

18. An apparatus according to claim 17, wherein said operation mode setting lever of said first operation mode setting means is arranged to slide along a cam groove formed in said cam and is provided with a plurality of cam parts for controlling the devices included in said tape driving mechanism.

* * * * *